No. 804,021. PATENTED NOV. 7, 1905.
E. MARQUARDT & H. VIERTEL.
MEANS FOR PRODUCING OXIDS OF NITROGEN.
APPLICATION FILED MAY 2, 1903.

3 SHEETS—SHEET 1.

No. 804,021. PATENTED NOV. 7, 1905.
E. MARQUARDT & H. VIERTEL.
MEANS FOR PRODUCING OXIDS OF NITROGEN.
APPLICATION FILED MAY 2, 1903.

3 SHEETS—SHEET 2.

WITNESSES:
INVENTORS
Ernst Marquardt
Hermann Viertel
BY Georgii & Massie
their Attorneys

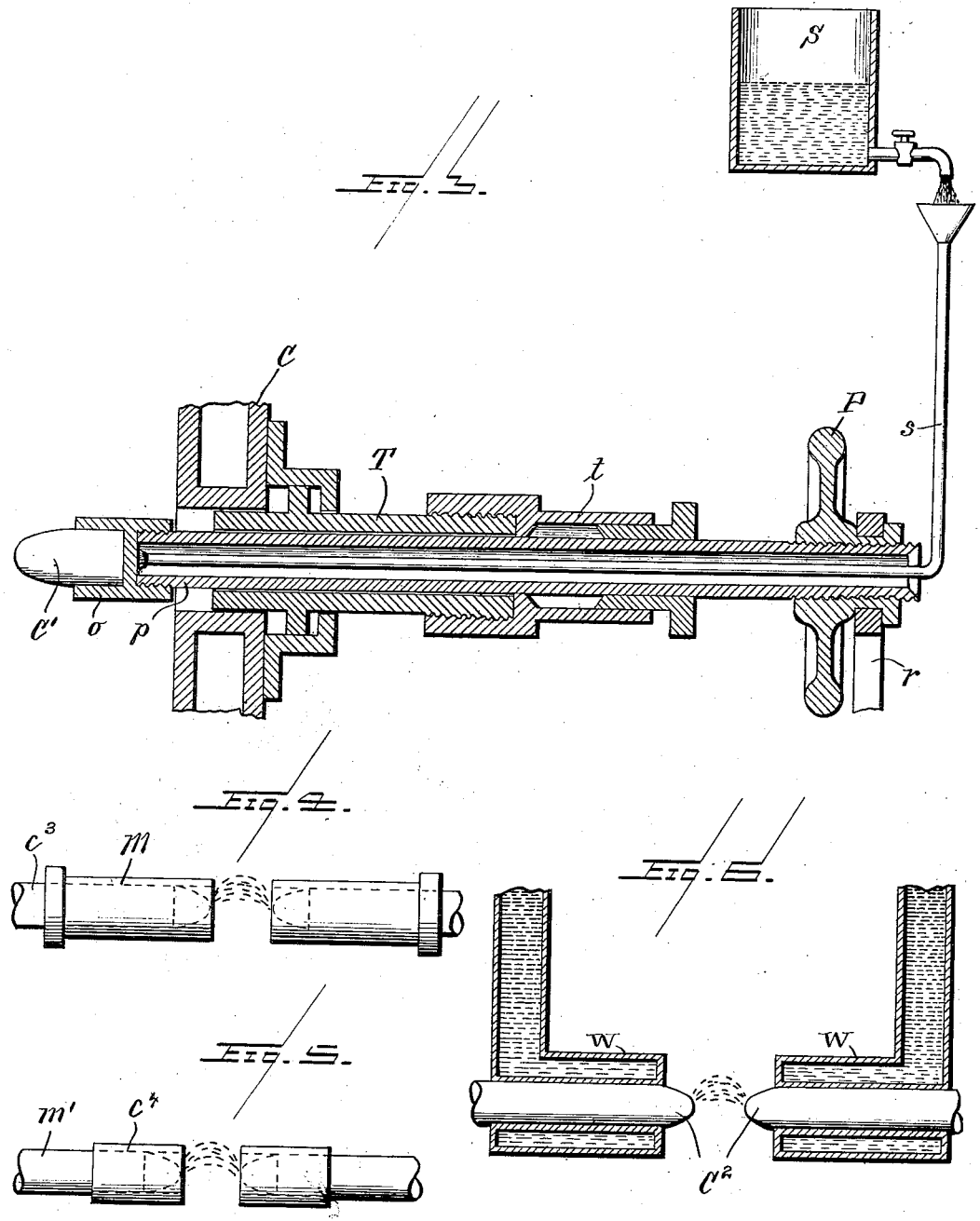

UNITED STATES PATENT OFFICE.

ERNST MARQUARDT, OF SCHÖNEBERG, NEAR BERLIN, AND HERMANN VIERTEL, OF CHARLOTTENBURG, GERMANY.

MEANS FOR PRODUCING OXIDS OF NITROGEN.

No. 804,021.  Specification of Letters Patent.  Patented Nov. 7, 1905.

Application filed May 2, 1903. Serial No. 155,364.

*To all whom it may concern:*

Be it known that we, ERNST MARQUARDT, chemist, residing at Schöneberg, near Berlin, 7 Helmstrasse, and HERMANN VIERTEL, engineer, residing at Charlottenburg, near Berlin, 17 Goethestrasse, Germany, subjects of the German Emperor, have invented certain new and useful Improvements in Means for Producing Oxids of Nitrogen; and we do hereby declare the following to be a full, clear, and exact description of the invention, such as will enable others skilled in the art to which it appertains to make and use the same.

In producing oxids of nitrogen from mixtures of nitrogen and oxygen by means of the electric arc the difficulty is encountered that only a small part of the mixture takes part in the reaction and is transformed into oxids of nitrogen. This difficulty hitherto formed a serious drawback, because the product cannot be easily and completely separated from a mixture containing small quantities of it.

Our improved process consists in this, that a mixture of oxygen and nitrogen is forced to perform a cycle continuously passing through an electric arc or discharge and thence to a cooling or absorbing apparatus, thence returning to the arc, &c. Thus a definite quantity of gas is gradually enriched with oxids of nitrogen until a concentration is reached at which every excess of product is retained in the cooling or absorbing apparatus. The uncondensed part of the product continues to circulate with the mixture and in passing the arc is continuously enriched with fresh product which it yields in the condenser.

Our invention will now be described in connection with the accompanying drawings, and then particularly pointed out in the claims.

Figure 1:
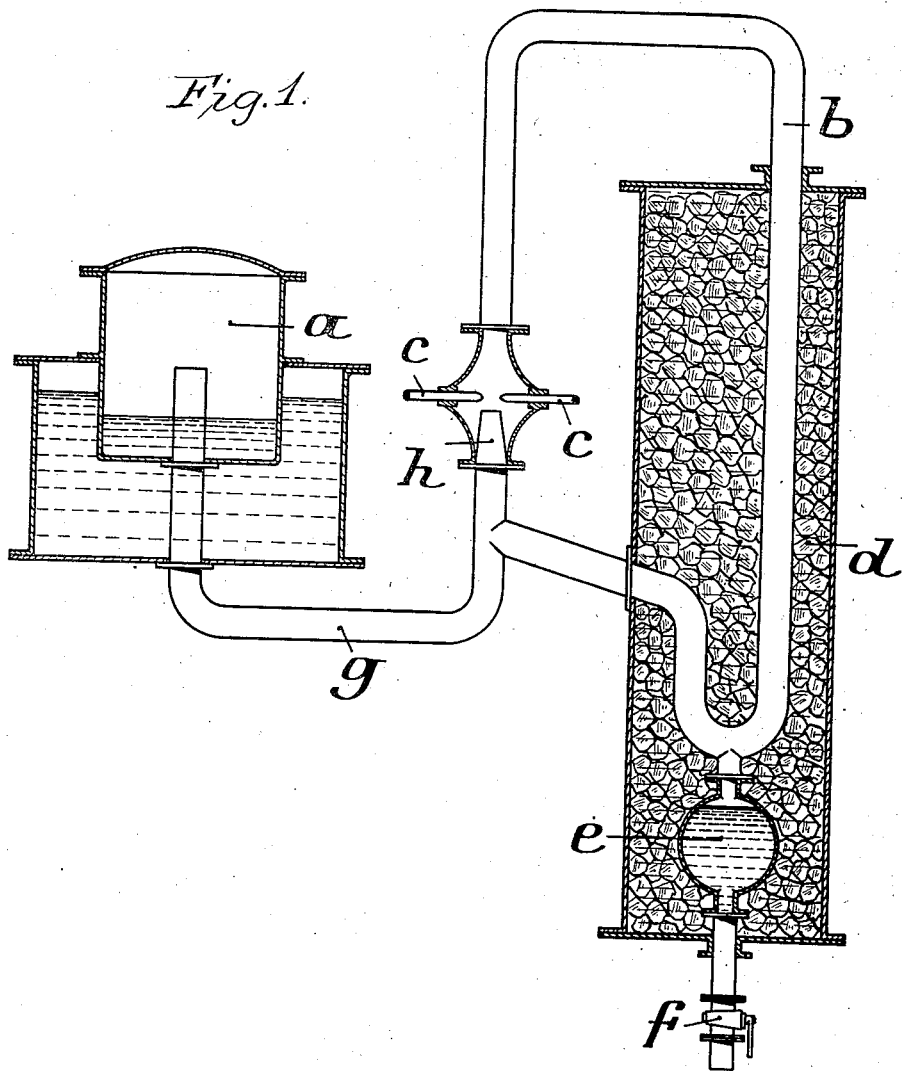
Figure 2:
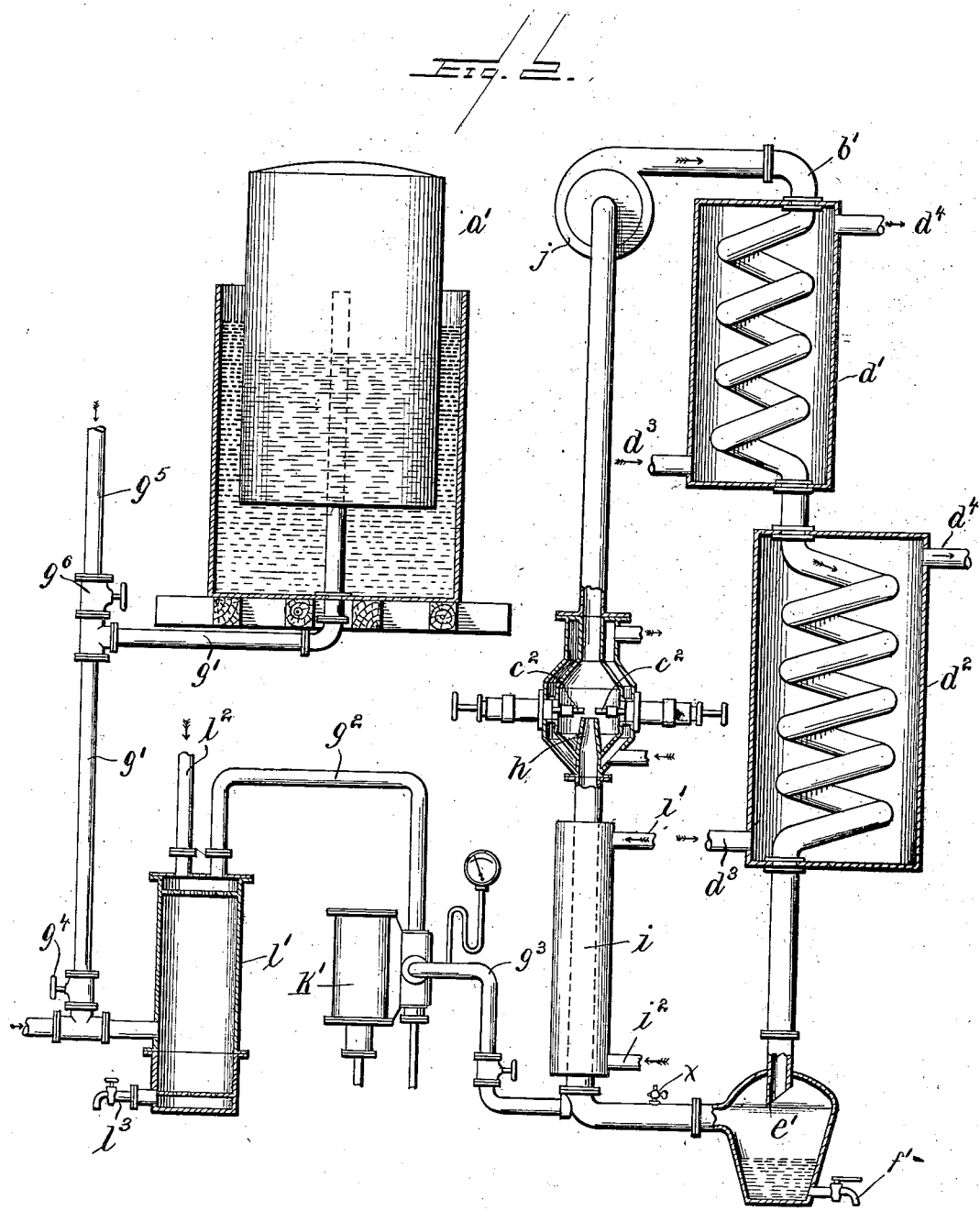

In the drawings, Figure 1 is a diagrammatic illustration of a simple form of apparatus embodying our invention. Fig. 2 is a similar view of another modification. Fig. 3 is a detail view, partly in section, illustrating one form of electrode employed by us. Figs. 4, 5, and 6 are detail views of other forms of electrodes which may be used.

Referring to Fig. 1 of the drawings, $b$ is a system of pipes forming a closed cycle. $c$ represents electrodes between which an electric discharge or arc is supposed to be maintained. $d$ is a vessel containing a cooling substance, such as a mixture of ice and salt or solid carbonic acid. $e$ is a condenser in which the formed product collects and from which it can be drawn off by means of a spigot $f$. At $a$ is indicated a vessel containing the raw material, and $g$ is a pipe connecting the vessel $a$ with the system $b$.

Referring to Fig. 2, $b'$ is the system of pipes forming a closed cycle. $c^2$ represents the electrodes between which the electric discharge or arc is produced. $d'$ $d^2$ indicate cooling devices, each having an inlet $d^3$ and an outlet $d^4$ for the supply of a suitable cooling medium. $e'$ is a condenser in which the product is collected and from which it may be drawn off by the spigot $f'$. At $a'$ is indicated a reservoir for the raw material—for example, oxygen or air and oxygen—this reservoir being in the form of a floating gas-bell, from which a pipe $g'$ leads to a suitable drying apparatus $l'$, having a pipe $l^2$, by means of which sulfuric acid may be supplied to the drier to absorb the moisture from the gas, the weakened acid being drawn off when desired through the spigot $l^3$. The drying apparatus is connected by a pipe $g^2$ with a suitable pump or compressor, as indicated at $k'$, and the latter is connected by a pipe $g^3$ with the closed-pipe system $b'$. In the pipe $g'$ is located a valve $g^4$, and to said pipe $g'$ is connected a pipe $g^5$, leading from a suitable supply of raw material. The pipe $g^5$ is provided with a valve $g^6$. By closing the valve $g^4$ in the pipe $g'$ and opening the valve $g^6$ a supply of raw material may be forced into the gas-bell $a'$, after which the valve $g^6$ may be closed and the valve $g^4$ opened, whereby the supply of raw material under pressure in the gas-bell $a'$ may be fed to the closed-pipe system $b'$ as required by the pump $k'$ at the desired pressure, the said raw material being deprived of its moisture on its way through the drier $l'$.

At $j$ is indicated a rotary blower or pump, which may be used to circulate the material in the closed-pipe system $b'$; but, preferably, a heating device is applied near the bottom of one side of the closed-pipe system in order to maintain such a circulation. For example, as shown in the drawings, the pipe system may be provided with a heating-jacket $i$, having an inlet $i^2$ and an outlet $i'$ for the supply of steam.

At $x$ is indicated a blow-off valve, by means of which a sample of the material in the closed-pipe system may be drawn off to be tested.

The advantage of this process consists in this, that in treating a comparatively small quantity of gas in the apparatus a mixture is subjected to condensation or absorption which contains a considerably higher percentage of nitrogen tetroxid ($N_2O_4$ or $NO_2$) than would be economically possible with other methods of working. Moreover, we avoid the very considerable losses which are the consequence of the usual method of procedure, which consists in compressing and cooling a definite quantity of gas mixture after treatment in the arc for the purpose of condensing the obtained product and then allowing the residue to escape.

A further advantage of the process consists in this, that it is thereby possible directly to obtain concentrated and pure products. For instance, we have succeeded in obtaining liquid and solid nitrogen tetroxid by mixing the gases required for the formation of this product, notably nitrogen and oxygen, in stoichiometrical proportions and allowing them to circulate between an electric discharge and a condenser at a pressure of from two to ten atmospheres. When a higher pressure is chosen, the temperature of the condenser need not be as low. When the pressure in the apparatus is equal to the atmospheric pressure, the condenser must be cooled to a temperature as low as 70° centigrade or even still lower.

A sufficient automatic circulation can be maintained by the difference of temperature between the arc and the condenser if the former is arranged so as to allow the warmed gas mixture to rise up and if the cooling part of the circuit be directed downward. For this purpose the arc is placed at a low position in the rising branch of the circuit. In some cases we prefer to produce the necessary circulation by means of a separate source of heat applied to the lower portion of the cycle, as indicated by the heater shown at $i$, Fig. 2. By regulating the source of heat the speed of circulation can then also be regulated within certain limits. However, the circulation can also be maintained and regulated by means of a special apparatus, such as a ventilator or a pump, as indicated at $j$, Fig. 2. However, this method of regulating the speed of circulation has the disadvantage of being complicated, and, moreover, the regulator or pump is seriously attacked by the oxids of nitrogen if special precautions are not provided.

The system forming the cycle is kept in connection with a vessel containing oxygen and nitrogen. As oxygen and nitrogen are used up fresh gas is from time to time introduced at the proper pressure.

Instead of mixing the required gases in stoichimetrical proportions and then introducing them it is also possible to introduce air and oxygen or air and gases containing a large percentage of oxygen separately as each constituent may be required by the process. By spectroscopic observation or by measuring the counter electromotive force of the arc or by testing a small quantity of the gas mixture it can be found whether oxygen or nitrogen should be added in order to maintain the reaction in the most advantageous state. However, as a rule no more gas should be introduced than is condensed in the cooling apparatus in the shape of oxids of nitrogen.

When mixtures are employed which are not composed of nitrogen and oxygen in the proportion of their combining weights for nitrogen tetroxid, but rather contain an excess of nitrogen—as, for instance, atmospheric air without an addition of pure oxygen—it will be evident that the closed cycle can only be maintained until the mixture is too much enriched with excessive nitrogen. Then also in this process the nitrogen must be allowed to escape and must be replaced by a mixture richer in oxygen. The smaller the excess of nitrogen is chosen the longer it will be possible to maintain the circulation and the more advantageous the process will become. The most advantageous proportions of the mixture employed will therefore practically depend upon the market price of oxygen or the mixture of oxygen and nitrogen and on the price of the obtained product.

We prefer to employ a mixture containing oxygen and nitrogen in the same proportions as does nitrogen tetroxid or the mixtures obtained by condensing atmospheric air containing about fifty per cent. nitrogen and fifty per cent. oxygen.

In any case the whole process is very simple. Continuous working is possible, which requires only very little supervision, and the losses of energy and of material are reduced to a minimum. Instead of condensation by means of cooling suitable absorbing-bodies can be introduced into the cycle according to the nature of the products sought for, such as cold water, nitric acid, caustic soda, organic bodies absorbing oxids of nitrogen, and such like.

Instead of using a single arc several may be employed; but in this case we prefer to arrange them side by side in order to prevent the gaseous mixture from passing through several arcs in series, whereby a partial reduction of the formed oxids would be caused.

The voltage of the currents we employ differs according to the products we wish to obtain. If we desire to produce as cheaply as possible nitrates or compounds containing oxids of nitrogen, we employ low electromotive forces of thirty to one hundred volts. We then use in the apparatus cheap mixtures of nitrogen and oxygen, such as atmospheric air under a pressure of about one to two atmospheres. Of course in using such a mixture the circulation of the gases can be continued only for a limited time, because of the gradual increase in the percentage of nitrogen in the circulating gas, which when it reaches a certain amount makes it necessary that the gas be discharged and replaced by a fresh mixture. The electrodes, which in this case conduct currents of considerable density, should be made of carbon containing fluorspar, or one of the means shown in Figs. 3, 4, or 5 should be employed. On the other hand, if it is desired to obtain pure nitrogen tetroxid, the best results are obtained by using a constant mixture of fifty per cent. oxygen and fifty per cent. nitrogen and replacing the oxygen and nitrogen which have been changed into nitrogen tetroxid by adding continuously a mixture containing two volumes of oxygen to one of nitrogen. In this manner the circulation of the gas may be carried on without interruption until the proportions of argon and other rare gases has increased to too great an amount. In working thus we prefer to use electrodes as durable as possible against oxygen and producing the fewest gaseous products of combustion—as, for example, electrodes consisting of mixtures of the salts or oxids of the metals mentioned hereinafter. The pressure of the gases should be two to ten atmospheres, and preferably about five atmospheres, in order to allow the liquid tetroxid to be separated easily. In this case the most profitable manner of working is to use weak currents and high terminal voltage of, for instance, five thousand to ten thousand volts.

The electrodes for the formation of the arc may be composed of any material which is otherwise employed for this purpose; but we have found it especially advantageous to use electrodes which contain compounds of metals, more especially fluorids, chlorids, borates, silicates, or oxids of the alkalies or earthy alkalies or of magnesium or mixtures of these. The metal compounds may be employed as admixtures to the mass of the electrode or may be embedded in its interior or form a surrounding coating.

We have found an electrode to be especially effective which mainly consists of carbon and contains from ten to thirty per cent. of fluorspar. One effect of these additions to the electrodes is a reduction of the resistance of the arc and the production of a very large and voluminous arc. Chiefly, however, the catalytic action of the additions is important, which favors the production of the oxids of nitrogen. A disadvantage in the use of carbon electrodes is the production of carbon monoxid, which is caused by the contact of the oxygen of the mixture with the heated electrode-points, because the oxids of nitrogen that are already formed are thereby partly reduced. We have found that it is possible to diminish this disadvantage by using electrodes which mainly consist of oxids, fluorids, or salts and to which a small quantity of carbon is added, barely sufficient to make them conductive. Also we may employ with advantage an electrode consisting chiefly of oxids, as indicated at $c^3$, Fig. 4, and surrounded by a carbon sleeve $m$, or the electrode, consisting chiefly of oxids, may be tubular, as indicated at $c^4$, Fig. 5, and may surround a carbon pencil $m'$, Fig. 5. Thus when the electrode has been sufficiently heated to become itself conductive the carbon can be retracted, so that it is withdrawn from the direct action of the arc.

An electrode constructed for this purpose is shown in detail in Fig. 3, in which view C is a portion of the wall of the electrode-chamber. $C'$ is an electrode of suitable material held in a socket $o$, which socket is mounted on the end of a rod $p$, which may be run in or out by a hand-wheel P, threaded onto the rod $p$ and revolubly mounted in a suitable bearing $r$. The rod $p$ is tubular, and means is provided for maintaining a circulation of water through it—as, for example, the water-supply pipe $s$, fed with water from a tank A. The rod $p$ is surrounded by a tubular sheath T, having a stuffing-box $t$, whereby the sheath may be slid back and forth on the rod $p$ without allowing the escape of the gases in the electrode-chamber.

Another arrangement for protecting the carbon from the action of the mixture of air and oxygen consists in this, that the mixture is caused to pass the arc in such a way that it comes into contact with the glowing electrode-points as little as possible. This object can be attained by making the arc sufficiently long and surrounding the active ends of the carbons by a protecting-sleeve, as shown in Fig. 5, or by introducing the gas mixture into the arc by means of a nozzle—such as $h$, Figs. 1 and 2—which allows it to pass through the active parts of the arc only, thus avoiding its contact with the glowing electrode-points. Moreover, we have found it of great advantage to cool the electrodes by suitable means whether they contain carbon or not. For example, as shown in Fig. 6, the electrodes $C^2$ may be surrounded by water-jackets W, by which they are cooled. On the one hand, the consumption of electrode material is thereby considerably reduced. On the other hand, the electrodes themselves can be subjected to much higher current densities, especially when electrodes are used which are liable to melt, such as, for instance, electrodes containing or consisting of pure metals. Pure metallic electrodes, for instance, would melt very easily in using heavy currents if special cooling devices were not provided. By cooling the electrodes, however, it is possible to produce very large and effective arcs without appreciably consuming the metal. Thus, for instance, a very effective arc is obtained between iron electrodes of very large cooling-surface.

Having now particularly described and ascertained the nature of our said invention and in what manner the same is to be performed, we declare that what we claim is—

1. Means for producing oxids of nitrogen from a mixture of oxygen and nitrogen, which means consists in the combination, with a system of pipes forming a closed cycle, of an electric-discharge device arranged within said system, means for separating the formed product, a vessel adapted to contain fresh raw material, and means for introducing under pressure greater than atmospheric fresh material from said vessel to said system.

2. In an apparatus of the class described, the combination, with a system of pipes forming a closed cycle, of an electric-discharge device arranged within said system, and means external to the closed system, connected therewith and arranged to supply fresh material to said system, under a pressure greater than atmospheric.

3. Means for producing oxids of nitrogen from a mixture of oxygen and nitrogen, which means consists in the combination, with a system of pipes forming a closed cycle, of an electric-discharge device arranged in said system, means for separating the formed product, a vessel adapted to contain fresh raw material and connected to said system, and a source of heat independent of the electric-discharge device and arranged to heat a lower portion of the said system, whereby a circulation is maintained in said system.

4. Means for producing oxids of nitrogen from a mixture of oxygen and nitrogen, which means consists in the combination, with a system of pipes forming a closed cycle, of a pair of electrodes containing metal compounds arranged in said system, means for separating the formed product, a vessel containing fresh raw material and connected to said system, means for separating the formed product, a vessel arranged to contain raw material, and means for introducing the raw material into said system.

5. Means for producing oxids of nitrogen from a mixture of oxygen and nitrogen, which means consist in the combination, with a system of pipes, of mechanism for producing an electric arc in said system, said mechanism comprising carbon electrodes containing fluorspar, means for separating the formed product, a vessel for containing the raw material and means for introducing the raw material into the said system, substantially as and for the purpose described.

6. Means for producing oxids of nitrogen from a mixture of oxygen and nitrogen, which means consist in the combination, with a system of pipes, of mechanism for producing an electric arc in said system, said mechanism comprising electrodes containing carbon, the points of which are protected against contact with the gaseous mixture by means of a sleeve of refractory material, means for separating the formed product, a vessel for containing the raw material, and means for introducing the raw material into the said system, substantially as and for the purpose described.

7. An apparatus for the production of oxids of nitrogen provided with electrodes containing calcium fluorid.

8. An apparatus for the production of oxids of nitrogen having electrodes containing carbon and calcium fluorid.

9. An apparatus for the production of oxids of nitrogen having electrodes consisting essentially of carbon and calcium fluorid.

In testimony whereof we have affixed our signatures to this specification in the presence of two witnesses.

ERNST MARQUARDT.
HERMANN VIERTEL.

Witnesses:
  WOLDEMAR HAUPT,
  HENRY HASPER.